Patented Apr. 1, 1947

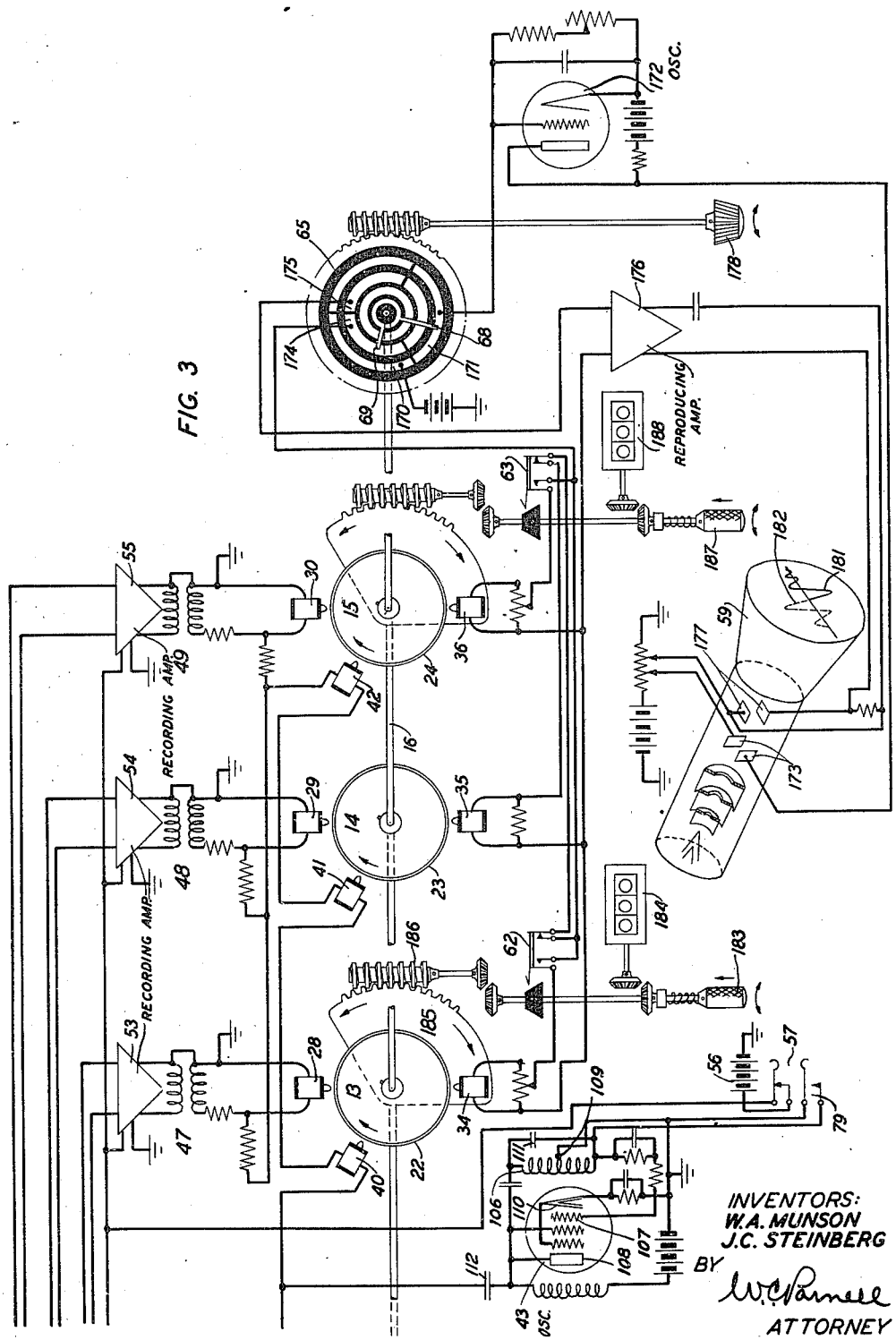

2,418,136

UNITED STATES PATENT OFFICE 2,418,136

ACOUSTIC RANGE FINDER

Wilden A. Munson, Chatham, and John C. Steinberg, Short Hills, N. J., assignors to Bell Telephone Laboratories, Incorporated, New York, N. Y., a corporation of New York Application November 10, 1943, Serial No. 509,710

6 Claims. (Cl. 181—0.5)

This invention relates to acoustic range finders of the type in which a sound source, such as an enemy gun, is located with respect to the ends of a base line by means of bearings determined from differences in arrival times of the sound at fixed points spaced about the ends of the line.

The object of the invention is a method and apparatus for quickly and accurately determining such bearings.

According to the general features of the invention the outputs of three microphones disposed in spaced relation at each end of the base line are recorded on a plurality of loop-type magnetic recording units operating in fixed relation to each other. The units record and erase continuously until, when the gunfire or other sound of interest is heard, the recording and erasing circuits are disabled to leave on each unit a record of the sound which is displaced from the other records of the same sound in accordance with the difference in the arrival times of the sound at the corresponding microphone positions.

One of the recordings from each end of the line is reproduced element by element until the signal, which may, for example, be the first shot of a machine gun burst, is identified and accurately indexed. The other recordings from each end of the base line are then reproduced in a similar manner and the corresponding signal on each is identified and accurately indexed with respect to the signal on the first record. Suitable registering devices, such as counters, associated with the indexing means automatically register the differences in arrival times in terms of the longitudinal displacements of these signals from those on the first records. The bearing of the sound source at each end of the line is then determined directly from the ratio of these counter readings.

In the preferred structure the recording units are all mounted in fixed relation on a common shaft which may be driven at increased speed for reproduction to produce satisfactory persistence of vision when the records are observed on a visual indicator such as an oscilloscope. The reproducing and oscilloscope sweep circuits are connected through commutators driven by the shaft and rotatably adjustable to show successive elements of the recordings until the signal has been identified. The indexing of the signal is effected by adjusting the commutator until the signal pattern is cut off at some easily identifiable point which can be accurately duplicated when indexing the other records.

Figure 1:
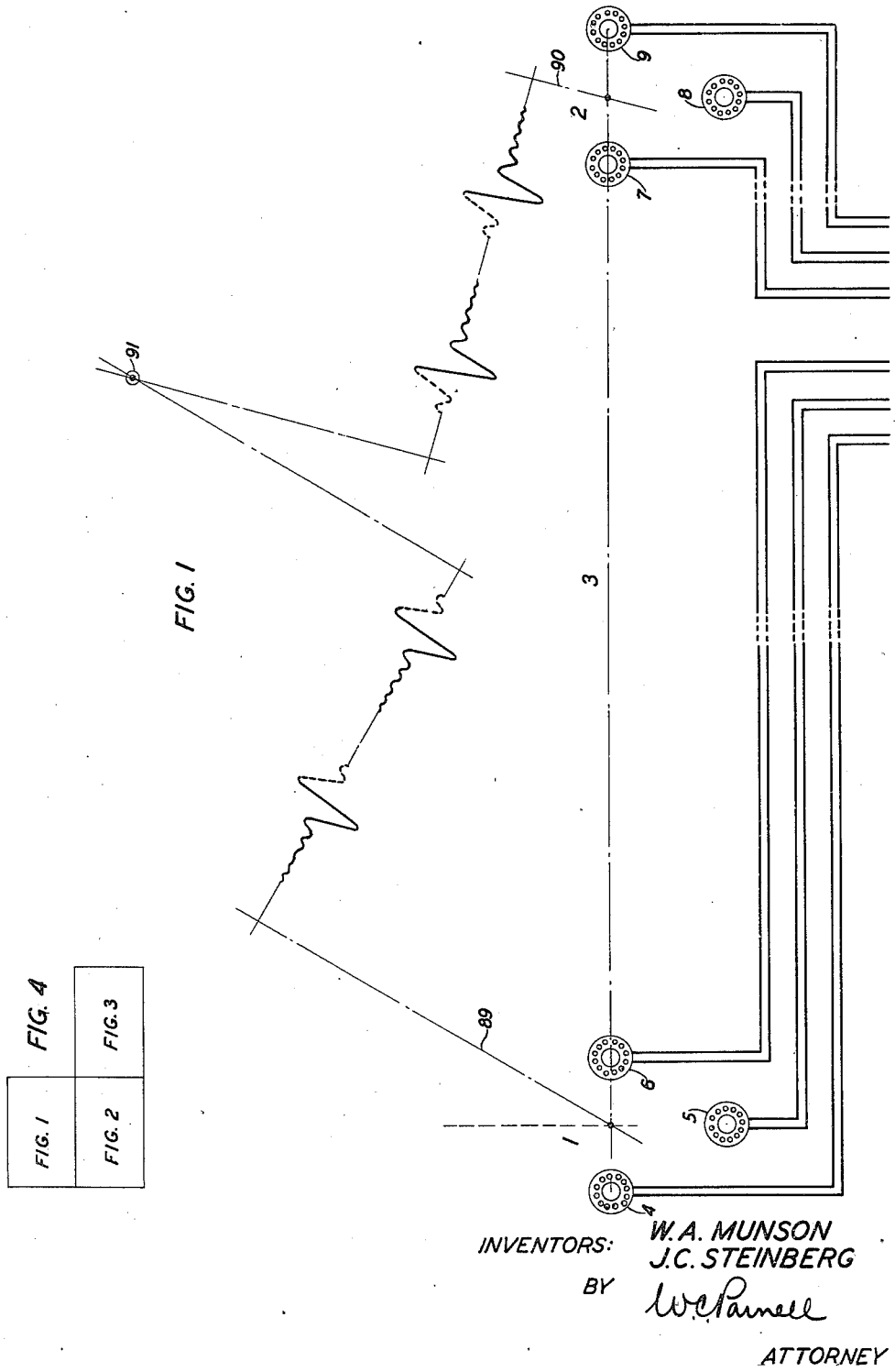
Figure 2:
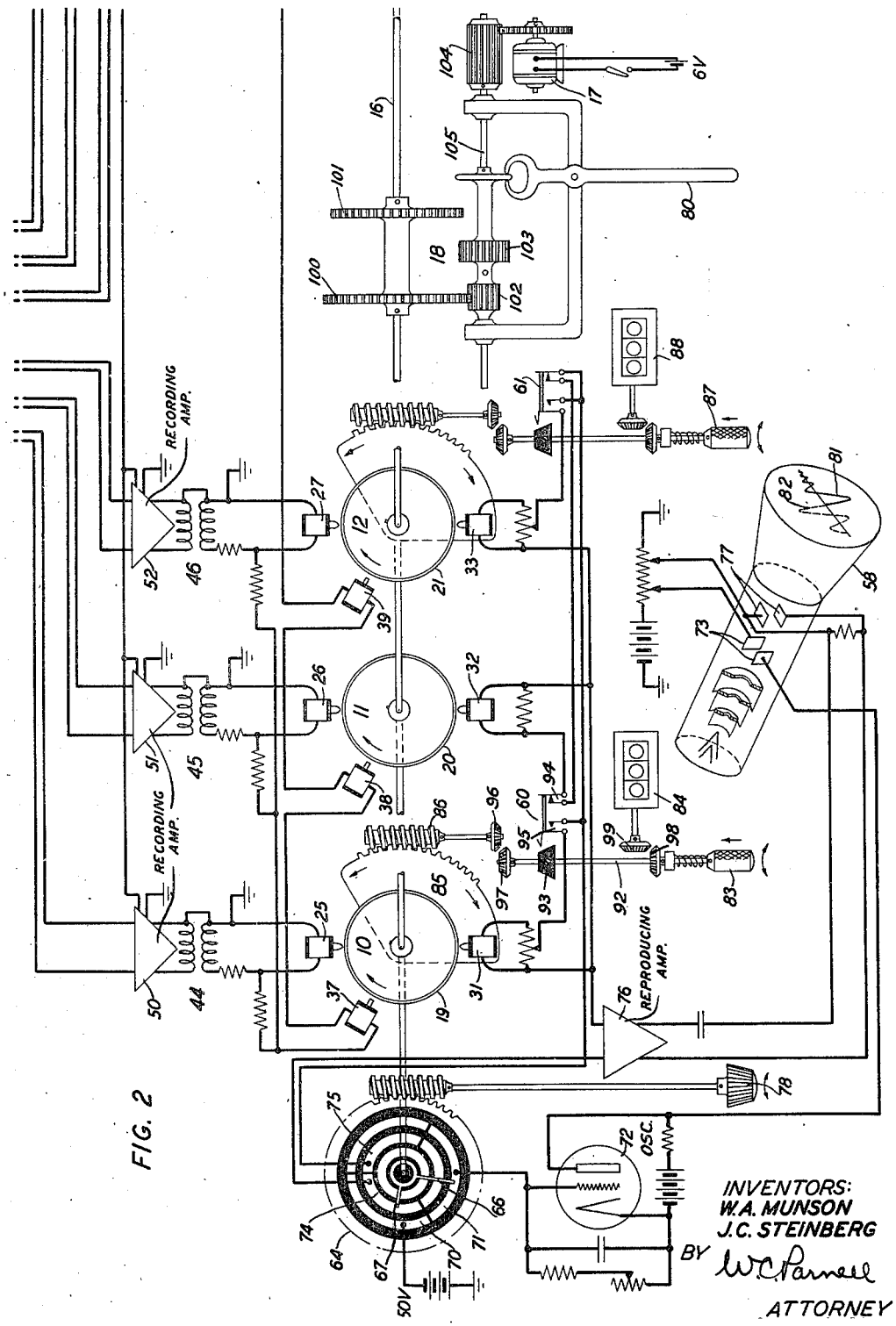

These and other features of the invention will be more clearly understood from the following detailed description and the accompanying drawing in which:

Figs. 1, 2 and 3 together show a range finder according to the invention and Fig. 4 is a diagram showing the relation of Figs. 1, 2 and 3 to each other.

In the drawing, the two pick-up positions 1 and 2 define the base-line 3 which is preferably disposed roughly normal to the probable direction of the sound source to be located. Each pick-up position is provided with microphones 4, 5, 6 and 7, 8, 9, respectively disposed in triangular relationship with one pair of microphones on the base-line as shown. The length of the base line will depend of course on the order of the distance to the sound source and the degree of accuracy required. When locating enemy machine guns the range finder will ordinarily be relatively close to the guns and the base-line may be, for example, only 100 yards long and in this case the microphones would be spaced of the order of 10 yards apart.

The apparatus for recording the sounds, as shown in Figs. 2 and 3, comprises six magnetic recording and reproducing units 10 to 15 all mounted in fixed relation on a common shaft 16 which is driven by a motor 17 through suitable gearing 18. The magnetic recording units comprise single loops 19 to 24 of magnetic material such as thin tape, mounted to rotate with the shaft, and recording magnets 25 to 30, reproducing magnets 31 to 36 and erasing magnets 37 to 42 cooperating with the tapes. In the apparatus shown the recorded matter is erased by high frequency alternating current supplied from any convenient source, such as a Hartley type vacuum tube oscillator 43 in which the inductance 106 which is connected between the control grid 107 and the plate 108 with its mid-point 109 connected to the cathode 110, is tuned by a condenser 111 in the usual manner. The output of the oscillator is supplied through a condenser 112 to the erasing magnets 37 to 42, the magnets being connected in series of three with return paths to ground through suitable resistors and the secondary coils of the associated output transformers 44 to 49 in order to provide a high frequency bias for the recording magnets as used for example in the system shown in Patent 2,235,132 to Wooldridge. The microphones are connected to the corresponding recording magnets through suitable amplifiers 50 to 55 all of which are energized by a battery 56 through a key 57.

Two cathode-ray oscilloscopes 58 and 59, one for the recorder units of each pick-up position, are provided for viewing the recorded matter, and the reproducing magnets 32 and 35 corresponding to the center pick-up microphones 5 and 8 respectively are normally associated with the oscilloscopes through keys 60, 61 and 62, 63 of the lateral channel recorder units 19, 21 and 22, 24, respectively. The operation of any one of these keys disconnects the center channel magnet and connects the corresponding lateral channel magnet to the oscilloscope. Adjacent the ends of the shaft 16 are commutators 64 and 65 having inner and outer rotatable segmented rings, the adjacent segments of which are bridged by brushes 66, 67 and 68, 69, respectively, as the shaft rotates. When the brush 66 of commutator 64 bridges segments 70 and 71, voltage from the sweep circuit of the oscillator 72 is applied to the plates 73, 73 of the oscilloscope 58 and shortly thereafter brush 67 bridges segments 74 and 75 thereby connecting magnet 32 to the input of the reproducing amplifier 76, the output of which is impressed on the plates 77, 77 of the oscilloscope. This results in the visual reproduction and indexing of a certain small portion of the record once per revolution of the shaft 16. By means of the knob 78 the commutator 64 may be rotated about the shaft 16 to scan the associated record element by element until the signal of interest is found. Similar facilities are provided in connection with commutator 65 for viewing the records 22 to 24 the corresponding elements not previously described being designated by corresponding numbers of the one hundred series.

When a sound source is to be located the apparatus will be in the condition shown with the several units continuously recording and erasing the sounds picked up by the several microphones so that at any instant each loop contains a recording of the sounds picked up in the preceding short time interval which may be of the order of one second. As soon as the sound of interest, such as a machine gun burst, is heard, the operator immediately operates the locking key 57 which disconnects the battery 56 from all of the recording amplifiers and disables the erasing oscillator 43 thereby preventing any further recording and preserving a record of the desired sounds on each of the units. The disabling of the oscillator by the operation of the key 57 is conveniently effected by contact 79 which short-circuits the lower portion of the coil 106 thereby preventing the feedback of alternating potential to the grid 107.

Since the reproducing magnets 32 and 35 are normally connected to the oscilloscopes, a segment of each of the records on tapes 20 and 23 is already being reproduced but to obtain satisfactory persistence of vision, it may be necessary when inspecting the records to increase the speed of shaft 16 by adjusting the speed of the motor 17 or by shifting the gears of the driving mechanism 18. In this mechanism the gears 100 and 101 are keyed to the shaft 16 and the pinions 102, 103 and 104 are keyed to the shaft 105 which may be shifted by the lever 80 to disengage the small pinion 102 from the larger gear 100 and engage the larger pinion 103 with the smaller gear 101 to increase the speed of the shaft 16 in the well-known manner.

The knob 78 is then turned to rotate the commutator 64 until the wave form characteristic of the sound of interest appears on the screen. In the case of a single shot of a machine gun burst the wave form is of the general character of the curve 81 shown on the screen of the oscilloscope 58. The knob 78 is then carefully adjusted to cut off this wave at some easily identified point which can be accurately duplicated when viewing the other records. For example, if the adjustment is such as to cut off the wave at a point 82 close to the horizontal axis of the oscilloscope screen, the wave will terminate in a sharp spike which enables the operator to position the wave very accurately with respect to the axis crossing. Then without disturbing the commutator adjustment, the button 83 is pushed inwardly to condition the apparatus for viewing the recording on the tape 19 and indexing it with respect to the recording on tape 20. The inward motion of the button 83 and its shaft 92 causes the tapered block 93 to operate the key 60 thereby opening contact 94 and closing contact 95 to disconnect the magnet 32 and connect magnet 31 to the oscilloscope 58. The magnet 31 is mounted on a rotatable gear segment 85 having a driving worm 86 which is operatively connected by the gears 96, 97 to the button 83 in its inward position. Similarly, the gear 98 on the shaft 92 engages gear 99 on the counter 84 which registers any rotary motion of the magnet 31.

By holding in and rotating the button 83 to rotate the segment 85 and the magnet 31 around the main shaft 16, the corresponding wave form from the tape 19 is found and indexed in the manner already described. In making the final setting the button 83 may be released repeatedly between adjustments to compare the wave form from tape 19 with that from tape 20 until the former is in accurate alignment with respect to the latter and is cut off at exactly the same point.

This procedure is then repeated with button 87 to index the record on the tape 21 by means of a counter 88 and associated mechanism, which as shown is merely a duplicate of that described in connection with the counter 84. When this is done the readings of the counters 84 and 88 will be in accordance with the differences in the times of arrival of the wave at the two lateral microphones 4 and 6 as compared with the arrival time at microphone 5. From the ratio of these readings the direction of the sound source from pick-up position 1 is determined as being on some such line as 89 (Fig. 1). The records on the tapes 22, 23 and 24 are then located and indexed in a similar manner and from the resulting readings of the counters 184 and 188 the sound source is found to be in the direction of line 90. By projecting these direction lines to their intersection at 91 the gun or other sound source is readily located by well-known plotting procedure.

The use of magnetic recording units effects a great economy in record material, permits the range finder to be kept available for use at all times without the delays incident to changing records or to a failure of new record supplies. Moreover, since the inspection of the records is made without removing them from the machine, the necessary data can be obtained much more quickly than with prior range finders of this general type.

While the invention has been described with reference to a particular embodiment it will be understood that various modifications of the structure shown may be made within the scope of the following claims.

What is claimed is:

1. In a sound ranging system, a plurality of spaced microphones for picking up sound waves from a source of sound to be located, a loop type magnetic recording member for each microphone, recording and erasing magnets for each recording member, means for driving the members to record and erase the outputs of the microphones, means for disabling all of the magnets to leave a record of the wave form of the sound from the source on each of the members, visual reproducing apparatus for selectively scanning the members to identify the recorded wave forms of said sound, means for bringing a plurality of the identified wave forms into accurate visual alignment registering devices operated in accordance with the operation of the aligning means whereby the differences in arrival time and hence the location of the sound may be determined.

2. In combination, a plurality of records, common driving means therefor, a translating device for each record, a reproducing circuit including a visual indicator, means for selectively associating the circuit with each of the devices, contacts operated by the driving means for completing the circuit and means for moving the contacts with respect to the driving means for visually reproducing selected portions of the record associated with the selected translating device.

3. In combination, a plurality of sound records of a source of sound to be located, common driving means therefor, a translating device for each record, a visual indicator, means for selectively connecting the indicator to each of the translating devices, means for moving each of said translating devices along its record to visually align corresponding points of said sound wave forms in said records registering means operated in accordance with the distance each translating device is moved whereby the differences in arrival time and hence the location of the sound may be determined.

4. In a sound ranging system, a plurality of spaced microphones for picking up sound waves from a source of sound to be located, a record member and a recording device for each microphone, a common drive shaft for the members, a pick-up for each record member, a circuit including a visual indicator to identify the recorded wave form of said sound, means for selectively associating the circuit with any one of the pick-up devices, contacts closed by the drive shaft for momentarily completing the circuit, means for rotating the contacts with respect to the shaft to reproduce successive elements of a selected record of said identified sound wave form, means for displacing one of the pick-ups along its record member to align corresponding points of said identified sound wave form with the wave form of the same sound as on another record member, and a device for registering the pick-up displacement to indicate the differences in arrival time whereby the location of the sound may be determined.

5. In an acoustic range finder, two spaced pick-up stations, three microphones grouped in spaced relation about each pick-up station for picking up sound waves from a source of sound to be located, three recording and reproducing units for each station each unit comprising a single loop magnetic record member and recording, reproducing and erasing magnets cooperating with the member, a common drive shaft for the members, a line connecting each microphone with a recording magnet, a reproducing circuit for the units of each pick-up station, each circuit including an oscilloscope for visually reproducing said sounds recorded on the members and being normally associated with the reproducing magnet of one of the units, a source of current for the erasing magnets, means for deenergizing all of the recording and erasing magnets to preserve a recording on each member of a desired sound, separate means operated by the shaft for momentarily closing each reproducing circuit to select a portion of the associated record member for visual reproduction by the oscilloscope, manually operable means for selecting different portions of the record member for reproduction and identification of said sound wave forms, means associated with each of the other two units for each pick-up station for selectively connecting the reproducing magnets of said two units to the reproducing circuit, means for shifting the reproducing magnets of said two units along the associated record members to align corresponding points of said recorded wave form with the wave form of the same sound as recorded on another record member, means for automatically recording the displacement of the magnet shifting means whereby the differences in arrival time and hence the location of the sound may be determined.

6. In a sound ranging system, a plurality of spaced microphones for picking up sound waves from a source of sound to be located, loop type magnetic recording means including a record member and recording and erasing magnets for each microphone, a source of power for driving the recording means to record and erase the outputs of the microphones, means for disabling all of the magnets to leave a recording of the wave form of the sound from the source as picked up by each of the microphones, visual reproducing apparatus for selectively scanning the recordings to correlate the recorded wave forms with the corresponding microphones, means for moving at least one of the reproducing magnets along its record member to advance or delay the reproduction for comparison with another reproduction by the visual reproducing apparatus, and a device for registering the displacement of each of the movable reproducing magnets whereby the differences in arrival time and hence the location of the sound may be determined.

WILDEN A. MUNSON.
JOHN C. STEINBERG.

REFERENCES CITED

The following references are of record in the file of this patent:

UNITED STATES PATENTS

| Number | Name | Date |
| --- | --- | --- |
| 1,326,955 | Mueller | Jan. 6, 1920 |
| 1,746,959 | Neely | Feb. 11, 1930 |
| 1,132,092 | Hesselius | Mar. 16, 1915 |
| 1,747,733 | Patterson | Feb. 18, 1930 |